(12) United States Patent
Clark

(10) Patent No.: US 9,253,941 B2
(45) Date of Patent: Feb. 9, 2016

(54) SPECIFIC LOCATION DRY YIELD MEASUREMENT FOR FORAGE

(75) Inventor: Stanley R. Clark, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 464 days.

(21) Appl. No.: 13/328,873

(22) Filed: Dec. 16, 2011

(65) Prior Publication Data

US 2013/0152534 A1    Jun. 20, 2013

(51) Int. Cl.
*A01D 34/00*   (2006.01)
*A01D 41/127*  (2006.01)
*A01F 15/08*   (2006.01)

(52) U.S. Cl.
CPC ............ *A01D 34/006* (2013.01); *A01D 41/127* (2013.01); *A01F 2015/0891* (2013.01)

(58) Field of Classification Search
USPC ...... 460/1, 4, 6, 7; 56/10.2 B, 10.2 C; 701/50
See application file for complete search history.

(56) References Cited

U.S. PATENT DOCUMENTS

| | | | | |
|---|---|---|---|---|
| 2,994,179 | A * | 8/1961 | Van Der Lely et al. | 56/377 |
| 6,315,658 | B1 * | 11/2001 | Weber | 460/6 |
| 6,401,549 | B1 * | 6/2002 | Ohlemeyer | 73/861.73 |
| 6,421,990 | B1 * | 7/2002 | Ohlemeyer et al. | 56/10.2 R |
| 6,431,981 | B1 * | 8/2002 | Shinners et al. | 460/6 |
| 7,197,979 | B2 * | 4/2007 | Derscheid | 100/87 |

* cited by examiner

*Primary Examiner* — Alicia Torres

(57) ABSTRACT

Dry yield for baled forage crop materials may be obtained for specific cut locations in the field by allocating the overall average baled dry yield for the entire field to the specific cut locations in accordance with the cut yield at such locations. Information obtained from a position sensor and one or more crop volume sensors on the windrower or mower is later combined with information obtained from a weight sensor on the baler to arrive at a specific location dry yield report for the baled product.

14 Claims, 3 Drawing Sheets

US 9,253,941 B2

SPECIFIC LOCATION DRY YIELD MEASUREMENT FOR FORAGE

TECHNICAL FIELD

The present invention relates to measuring the yield of harvested crops and, more particularly, to measuring the dry yield of baled forage crops for specific cut locations within a field after the crops have been cut from the ground, allowed to dry, and then baled into suitable bale packages for further handling.

BACKGROUND AND SUMMARY

Various methods have heretofore been suggested for measuring the cut yield of forage crop materials at specific locations within the field as the cut materials pass through the machine that severs them from the ground. However, due to the unique nature of forage crop materials and the many variables that exist in the size, shape and density of the stalks, stems, and mat or stream moving through the machine, it is extremely difficult to determine actual cut yield in meaningful units of measurement with any degree of accuracy. At best, the data obtained from prior methods could thus only be relied upon to provide the user with yield information in relative terms, i.e., a comparison of the volume in one part of the crop materials stream with another. Furthermore, measurement of yield for baled forage crop materials needs to be determined when the forage is dry, not as cut yield, because baled forage is sold as dry matter.

Conventionally, dry yield can be averaged over the entire field by measuring the weight of the finished bale(s) and dividing that number by a value for the surface area actually harvested. This gives a total dry yield per unit area, e.g., tons per acre, but does not answer the question of where the yield came from within the field. In order to improve the preciseness of crop fertilization techniques and other agronomic practices, it is critical that dry yield data be available for specific locations with the field, not just as an average over the total area of the field.

Complicating matters is the fact that the crop cutting (windrowing) and baling operations are carried out by different machines at different times in the harvest cycle. Moreover, the separate operations of windrowing, raking and baling can result in the forage materials being moved substantial distances from their original starting points, particularly where the materials are being prepared for baling by large rectangular balers which require that several small windrows be combined into one large windrow to achieve optimum baler efficiency.

The present invention overcomes the deficiencies and complicating factors of the prior art and provides a way of obtaining dry yield measurements for baled forage at specific cut locations within the field.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
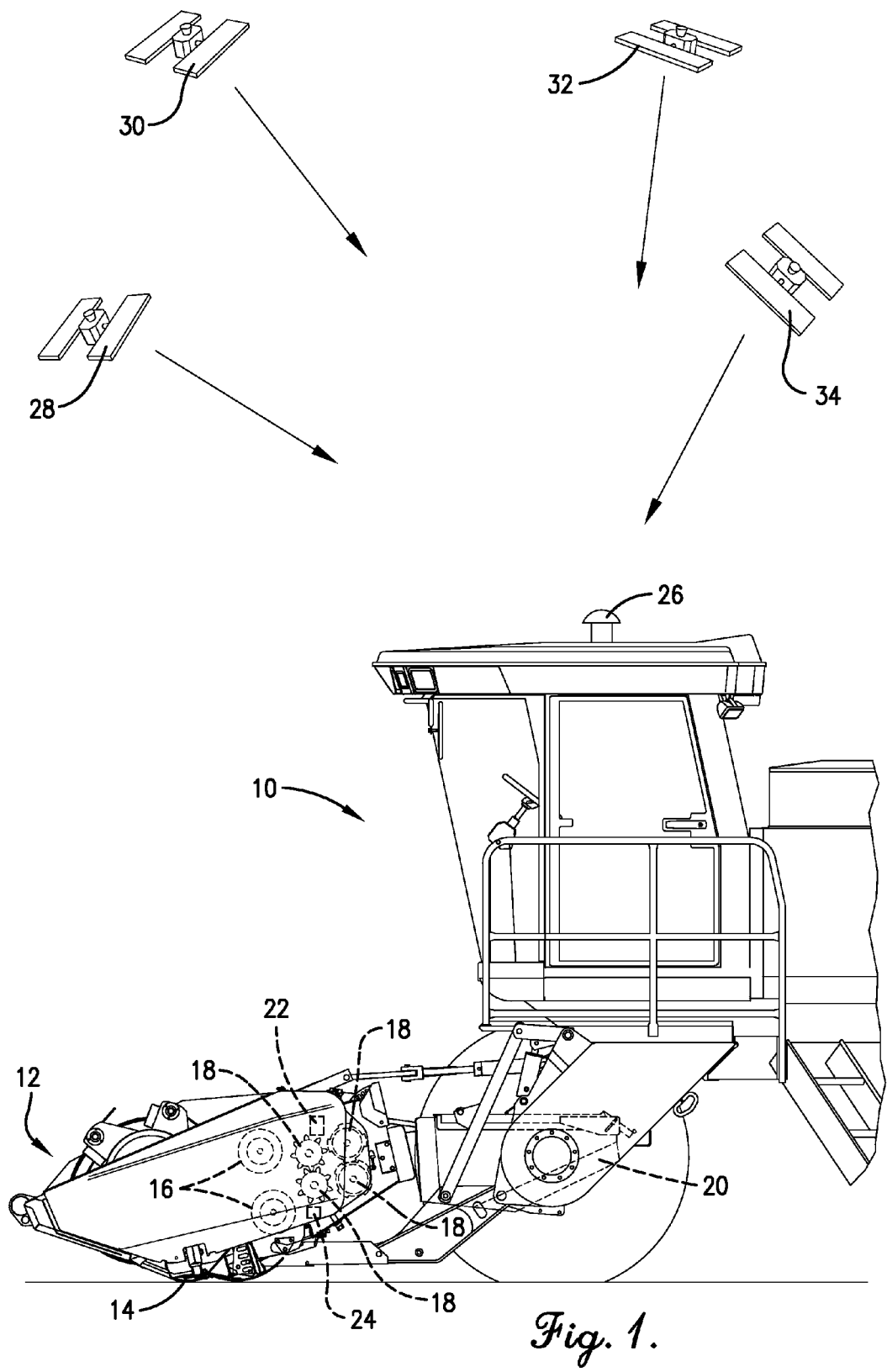
FIG. 1 is a fragmentary illustration of a windrower usable in carrying out the principles of the present invention.

FIG. 1 illustrates a windrower 10 that is adapted to sever standing forage crop materials from the field, condition the cut materials, and return them to the field in a windrow or swath for drying. In the particular embodiment illustrated in the drawing, windrower 10 happens to comprise a self-propelled windrower (it could just as easily be a pull-type machine). Windrower 10 has a header 12 having the usual reciprocating or rotary cutter mechanism 14 for cutting the standing crop as the machine advances, center-gathering auger mechanism 16 (a pair of augers in this embodiment) for converging the cut crop materials centrally following severance, and conditioning mechanism 18 (two pairs of conditioning rolls in this embodiment) for crimping the stems of the cut crop materials as the stream of materials travels rearwardly through the header. Forming shields 20 behind conditioning rolls 18 direct the conditioned materials back down onto the ground in a windrow or swath.

In accordance with the present invention, provision is made for sensing on an ongoing basis the amount of cut crop materials being taken from the ground by windrower 10. A variety of techniques may be utilized to carry out this objective. One exemplary embodiment takes advantage of the fact that the upper roll of each pair of conditioning rolls 18 is movable vertically away from its corresponding lower roll by the force of the stream of cut crop materials passing between the rolls, thus increasing the opening distance between the rolls to the extent necessary to accommodate the amount of material in the stream. This opening distance may be sensed by any suitable means such as an opening distance sensor 22 operably associated with one pair of the conditioning rolls 18. Opening distance sensor 22 may, for example, comprise an electrical potentiometer capable of producing an electrical output whose magnitude is in accordance with the size of the opening created between the rolls by the moving stream of crop materials. The potentiometer could, for example, be associated with the extendable rod of a hydraulic tensioning cylinder that applies biasing closing force to an upper conditioning roll, or to other structure that changes position as the opening distance is increased or decreased. Other suitable devices such as, for example, light sensors and acoustic sensors, may also be utilized in determining the amount of crop materials present or the conditioning roll opening distance without departing from the principles of the present invention.

Another means for sensing, either independently of or in combination with opening distance sensor 22, the amount of cut crop materials being cut from the ground by the windrower 10 may take advantage of the fact that conditioning rolls 18 are typically yieldably biased toward one another to maintain the opening distance at a minimum. Such yieldable biasing means typically comprise pneumatic, hydraulic, or mechanical spring "tensioning" systems. The greater the volume of cut crop materials passing between conditioning rolls 18, the greater the exertion of such materials against the rolls when separating them. Accordingly, an exertion sensor 24 may be operably associated with one pair of the rolls 18 for providing an electrical output in accordance with the force/pressure exerted by the moving stream of cut crop materials. Force/pressure sensor 24 could, for example, comprise a suitable pressure sensor as part of the pneumatic or hydraulic circuit for tensioning the rolls, or a potentiometer set up to sense the change in force during spring deflection, depending upon the type of system utilized for tensioning the conditioning rolls. Electrical measurements of the opening distance and/or pressure or force could be multiplied and stored as a relative indicator number by specific field location.

Windrower 10 is provided with suitable means for determining the specific location of the windrower in the field on an ongoing basis during the cutting operations. Although a variety of such means could be utilized, in the illustrated embodiment windrower 10 is outfitted with a global-positioning system 26 represented by a GPS radio antenna. Hovering above the earth are several satellites 28, 30, 32 and 34 utilized by the windrower's GPS system 26 for determining the coordinates of the windrower. The GPS system 26 can also be utilized for determining the amount of field surface area covered by header 12 of windrower 10 during the crop cutting operations, given the known width of the particular header being utilized.

Figure 2:
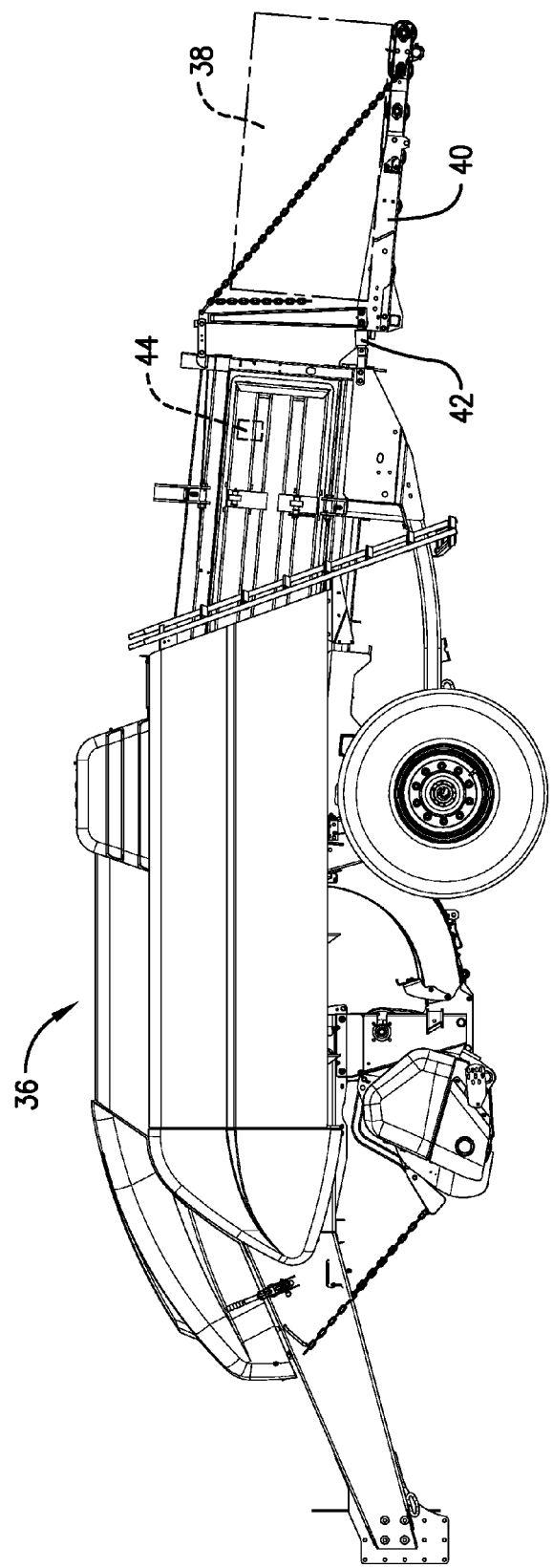
FIG. 2 is a side elevational view of a baler usable in carrying out the principles of the present invention.

After the cut crop materials have been returned to the ground for a period of time and have had an opportunity to adequately dry, the dried crop materials may be removed from the ground and packaged into bales for further handling and storage. FIG. 2 illustrates one exemplary baler 36 which may be utilized in carrying out these operations. In the illustrated embodiment, baler 36 comprises a large rectangular baler capable of making large rectangular bales such as the bale 38 on the discharge chute 40 of baler 36. Other types of balers such as, for example, large "round" balers and small "square" balers, may also be utilized without departing from the principles of the present invention.

In accordance with the present invention, bales produced by baler 36 from the dry forage crop materials taken from a particular field are weighed to provide information used in calculating dry yield. For convenience, such weighing operations may be carried out while the bales are still carried by the baler, although they can also be done after the bales have completely left the baler. In the illustrated embodiment, baler 36 includes a load cell 42 connected between the main frame of the baler and discharge chute 40 for the purpose of sensing the weight of bale 38 when it has fully emerged from the baling chamber of the machine. A moisture sensor 44 of any suitable design may be associated with baler 36 for sensing the moisture level of crop materials in the bales being produced by baler 36 and for providing an output indicative of such moisture level.

Figure 3:
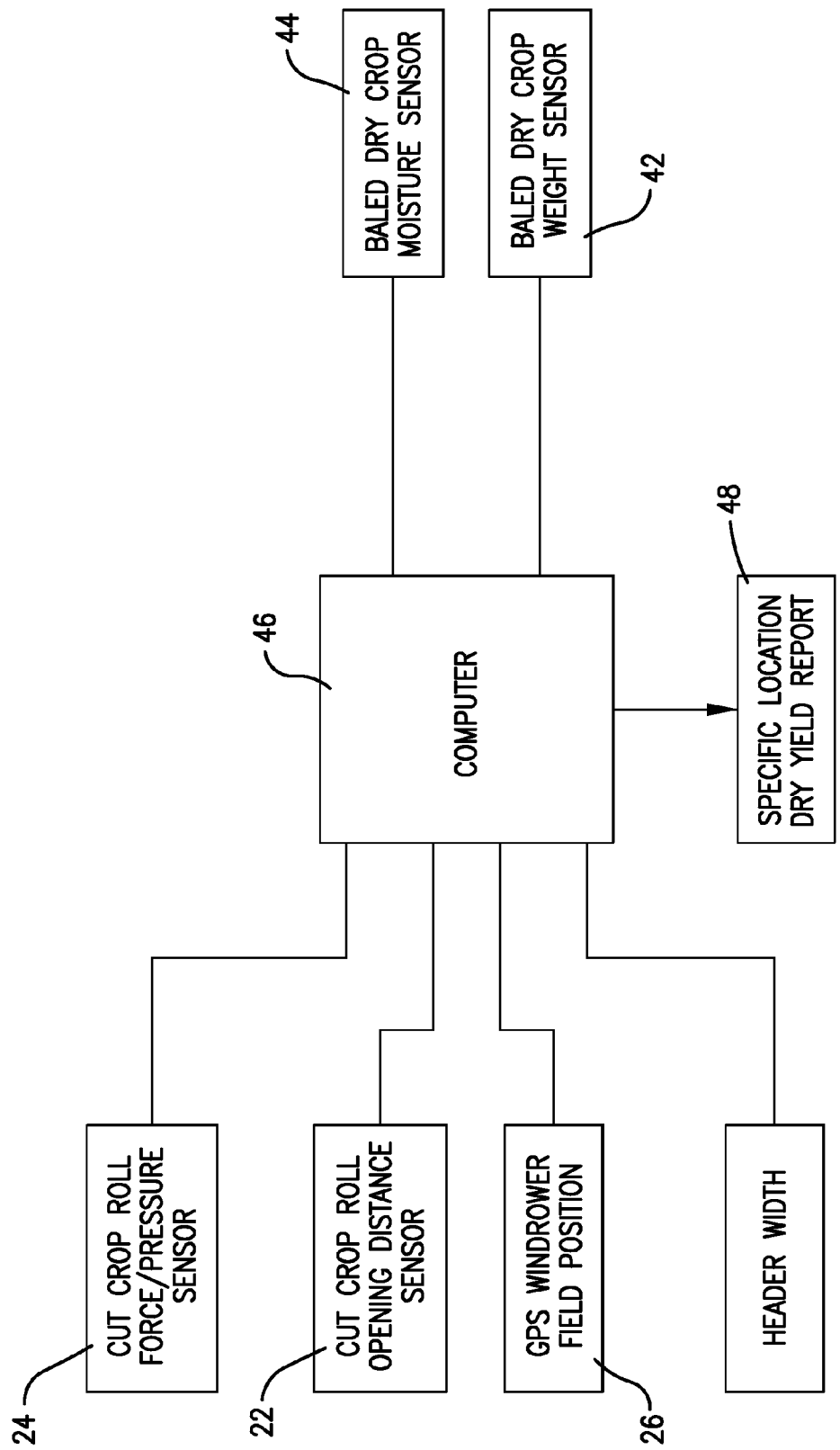
FIG. 3 is a diagram illustrating the manner in which information is processed to provide specific location dry yield measurement in accordance with the principles of the present invention.

FIG. 3 illustrates how cut crop information from the cutting operations and dry crop information from the baling operations are inputted to a computer and memory 46 for producing a specific location dry yield report 48. The computer and memory comprises any combination of hardware, software instructions and data from windrower 10 and baler 36 that are used to produce the report 48. Computer and memory 46 could comprise devices located on either or both pieces of harvesting equipment or the tractors which may pull them (in the case of pull-type machines), and/or it could also include laptop, desktop computers and various mobile communication devices. Telemetry could be used to communicate the various components of the system with one another.

Weight information from baler 36, coupled with the known area of the particular field covered by the header 12 of windrower 10, allows the computer and memory 46 to determine the overall average dry yield (such as in tons per acre) of the crop materials contained within the bales produced by baler 36 from the particular field in question. This information, when combined with roll force/pressure, roll opening distance, and specific position information from windrower 10, permits the computer and memory 46 to calculate the dry yield at specific locations across the field by allocating the dry yield to the specific locations in accordance with the specific calculated indicator number for such locations made up from the opening and force/pressure measurements. The result is a yield report at a known level of dryness (from moisture sensor 44) and in weight per unit area for any and all of those specific locations where the crop was cut from the ground as determined by the GPS positioning system. The moisture information from sensor 44 could be used to adjust the dry yield if desired.

Of course, the dry yield report 48 could take a wide variety of different forms. For example, it could simply comprise information or images displayed on a computer screen or mobile device. On the other hand, it could comprise written information or indicia on a suitable permanent media. An area specific yield map is one possible form that the report could take. In any event, it should be apparent that the principles of the present invention are not limited to any particular form or type of output for the report 48.

The inventor hereby states his intent to rely on the Doctrine of Equivalents to determine and assess the reasonably fair scope of his invention as pertains to any apparatus or method not materially departing from but outside the literal scope of the invention as set out in the following claims.

The invention claimed is:

1. A method of determining dry yield at specific locations in a forage crop field, said method comprising the steps of:
    cutting forage crop material from the ground using a forage crop material cutting implement while passing through the field;
    sensing the amount of forage crop material being cut from the ground on an ongoing basis while passing through the field;
    determining a specific location of the cutting implement in the field at which the amount of cut forage crop material is being sensed on an ongoing basis;
    determining an amount of field surface area covered by the implement while the forage crop material is being cut from the ground;
    returning the cut forage crop material to the ground;
    removing the cut forage crop material from the ground after the cut forage crop material has had an opportunity to dry;
    baling the dried forage crop material into bales;
    weighing the bales to determine a total weight of baled dried forage crop material;
    determining an overall average dry yield of the forage crop material by dividing the total weight of the bales by the field surface area;
    calculating, via a computing device, dry yield at specific locations across the field using the overall average dry yield, the sensed amounts of cut forage crop material, and the specific locations of the implement in the field at which the amounts of cut forage crop material were sensed, to allocate dry yield values to the specific locations;
    generating a dry forage crop material yield report via the computing device, the dry forage crop material yield report comprising at least one image representing an area specific yield map; and
    displaying the dry forage crop material yield report on a display screen of the computing device.

2. A method as claimed in claim 1,
    said amount sensing step including sensing the opening distance between a pair of separable conditioning rolls through which a stream of cut forage crop material is passed.

3. A method as claimed in claim 1,
said amount sensing step including sensing the exertion from a stream of cut forage crop material as the stream passes between a pair of separable conditioning rolls.
4. A method as claimed in claim 3,
said exertion sensing step comprising sensing pressure.
5. A method as claimed in claim 3,
said exertion sensing step comprising sensing force.
6. A method as claimed in claim 3,
said amount sensing step further including sensing the opening distance between a pair of separable conditioning rolls through which a stream of cut forage crop material is passed.
7. A method as claimed in claim 1,
said location determining step including the use of global positioning satellite technology.
8. A method as claimed in claim 1,
further comprising the step of raking the cut crop laterally after the cut crop is returned to the ground and before said removing and baling steps.
9. A method as claimed in claim 1,
further comprising the step of checking the moisture content of the dried forage crop materials after the dried forage crop materials have been removed from the field and using information obtained from said checking step in said calculating step.
10. A method as claimed in claim 1,
further comprising the step of determining the area of the field from which forage crop material has been cut from the ground and using information obtained from said area determining step in said calculating step.
11. A method as claimed in claim 1,
further comprising the step of determining the area of the field from which forage crop material has been cut from the ground and using information obtained from said area determining step in said calculating step,
further comprising the step of storing information obtained from said area determining step in memory until completion of said weight sensing step.
12. A method as claimed in claim 1,
said amount sensing step including sensing the opening distance between a pair of separable conditioning rolls through which a stream of cut forage crop material is passed and sensing the exertion of the stream as it passes through the conditioning rolls,
said location determining step including the use of global positioning satellite technology,
further comprising the step of checking the moisture content of the dried forage crop materials after the dried forage crop materials have been removed from the field and using information obtained from said checking step in said calculating step,
further comprising the step of determining the area of the field from which forage crop material has been cut from the ground and using information obtained from said area determining step in said calculating step.
13. A method as claimed in claim 12,
said exertion sensing step comprising sensing pressure.
14. A method as claimed in claim 12,
said exertion sensing step comprising sensing force.

\* \* \* \* \*